(12) United States Patent
Gavran et al.

(10) Patent No.: US 10,449,476 B2
(45) Date of Patent: Oct. 22, 2019

(54) CLEANING SYSTEM FOR PAINT PARTICLES

(71) Applicant: BRAIN FLASH—PATENTENTWICKLUNGS GMBH, Lienz (AT)

(72) Inventors: Jadranko Gavran, Lienz (AT); Michael Eder, Lienz (AT)

(73) Assignee: BRAIN FLASH-PATENTENTWICKLUNGS GMBH, Lienz (AT)

( * ) Notice: Subject to any disclaimer, the term of this patent is extended or adjusted under 35 U.S.C. 154(b) by 277 days.

(21) Appl. No.: 15/165,477

(22) Filed: May 26, 2016

(65) Prior Publication Data

US 2016/0263506 A1  Sep. 15, 2016

Related U.S. Application Data

(63) Continuation of application No. PCT/AT2015/000033, filed on Mar. 2, 2015.

(30) Foreign Application Priority Data

Apr. 7, 2014 (AT) .................. A 260/2014

(51) Int. Cl.
 *B01D 45/00* (2006.01)
 *B01D 45/08* (2006.01)
 (Continued)

(52) U.S. Cl.
 CPC .......... *B01D 45/08* (2013.01); *B01D 50/002* (2013.01); *B05B 14/40* (2018.02); *B01D 39/16* (2013.01);
 (Continued)

(58) Field of Classification Search
 CPC ...... B01D 45/08; B01D 50/002; B01D 39/16; B01D 39/18; B01D 46/0002; B01D 46/0016; B05B 14/40; Y10S 55/31
 See application file for complete search history.

(56) References Cited

U.S. PATENT DOCUMENTS 3,744,222 A  7/1973 Delao
5,922,110 A  7/1999 Weaver et al.
(Continued)

FOREIGN PATENT DOCUMENTS

AT  411 331  12/2003
DE  195 29 618  2/1997
(Continued)

OTHER PUBLICATIONS

International Search Report dated Jun. 17, 2015 in International (PCT) in International Application No. PCT/AT2015/000033.
(Continued)

*Primary Examiner* — Dung H Bui
(74) *Attorney, Agent, or Firm* — Wenderoth, Lind & Ponack, L.L.P.

(57) ABSTRACT

A cleaning module for cleaning an air stream includes a hollow article which has an inlet port for the entry of the air stream to be cleaned and an outlet port for the exit of the cleaned air stream. A cleaning structure is provided for cleaning the air stream by particle separation and/or for filtration of the air stream. The cleaning structure has at least two separate cleaning sub-structures which through an opening element in the hollow article can be removed from the hollow article and/or can be arranged inside the hollow article.

18 Claims, 8 Drawing Sheets

(51) Int. Cl.
  *B01D 50/00* (2006.01)
  *B05B 14/40* (2018.01)
  *B01D 39/16* (2006.01)
  *B01D 39/18* (2006.01)
  *B01D 46/00* (2006.01)

(52) U.S. Cl.
  CPC .......... *B01D 39/18* (2013.01); *B01D 46/0002* (2013.01); *B01D 46/0016* (2013.01); *Y10S 55/31* (2013.01)

(56) References Cited

U.S. PATENT DOCUMENTS

| | | | |
|---|---|---|---|
| 7,309,369 | B2 | 12/2007 | Eder |
| 7,988,769 | B2 | 8/2011 | Wieland et al. |
| 8,961,642 | B2 | 2/2015 | Holler et al. |
| 2005/0229560 | A1 | 10/2005 | Eder |
| 2008/0229925 | A1 | 9/2008 | Wieland et al. |
| 2013/0186049 | A1 | 7/2013 | Holler et al. |

FOREIGN PATENT DOCUMENTS

| | | |
|---|---|---|
| DE | 20 2007 013 656 | 1/2008 |
| DE | 10 2008 021 225 | 10/2009 |
| DE | 10 2011 050 915 | 12/2012 |
| EP | 1 270 059 | 1/2003 |
| EP | 2505268 | 10/2012 |
| FR | 2.186.844 | 1/1974 |
| GB | 2 140 707 | 12/1984 |
| JP | 52-111967 | 8/1977 |
| JP | 61-87511 | 6/1986 |
| JP | 2005-522310 | 7/2005 |
| KR | 20140017485 | 2/2014 |
| WO | 03/084638 | 10/2003 |

OTHER PUBLICATIONS

Search Report dated Nov. 13, 2014 in Austrian Application No. A 260/2014.
Extended European Search Report dated Apr. 21, 2017 in corresponding European Application No. 16192585.

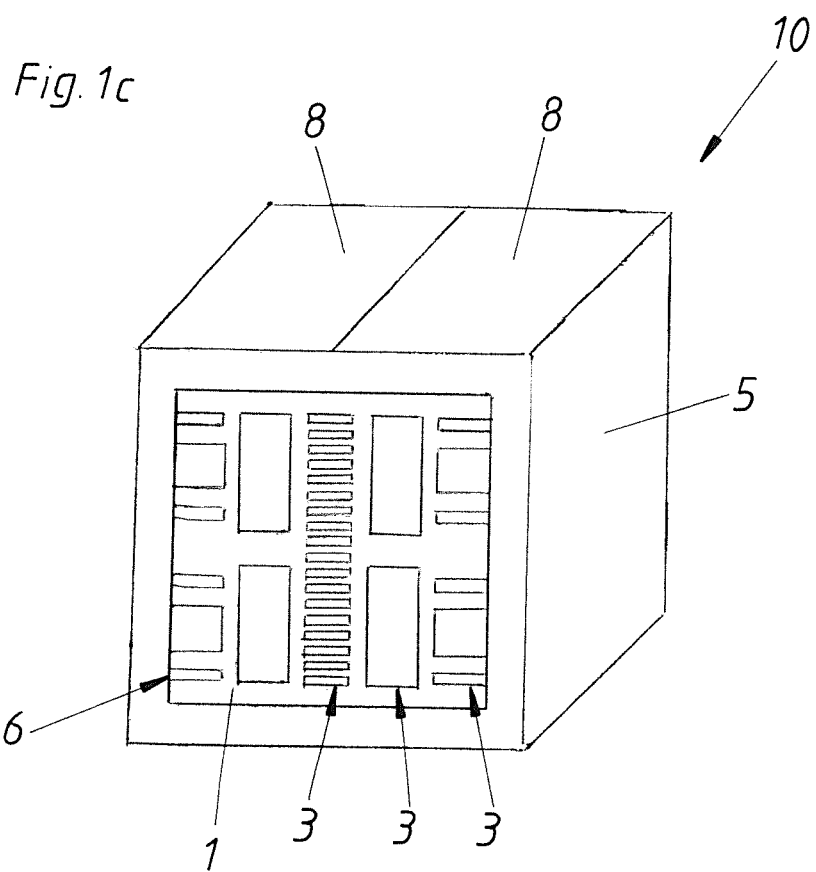

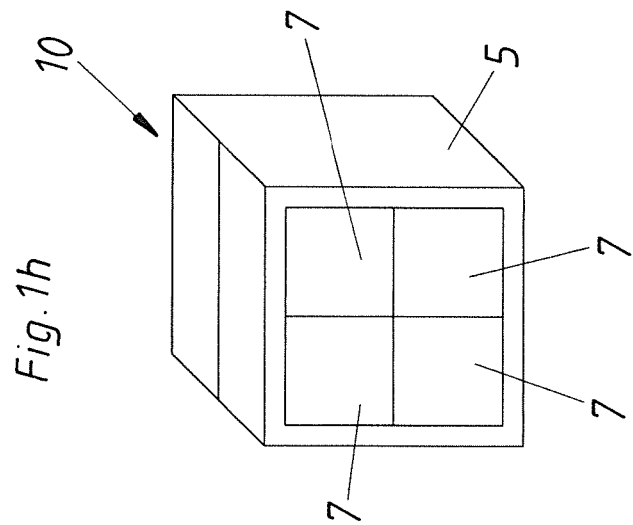
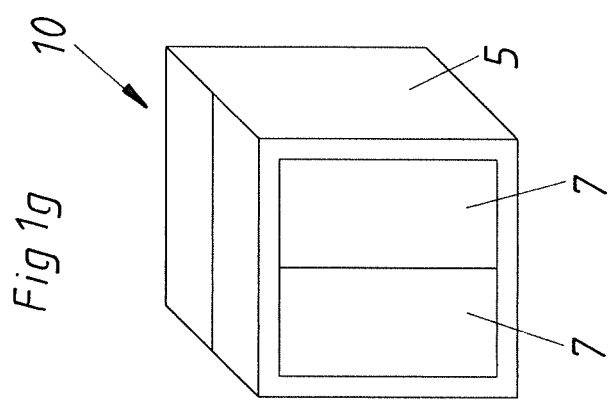
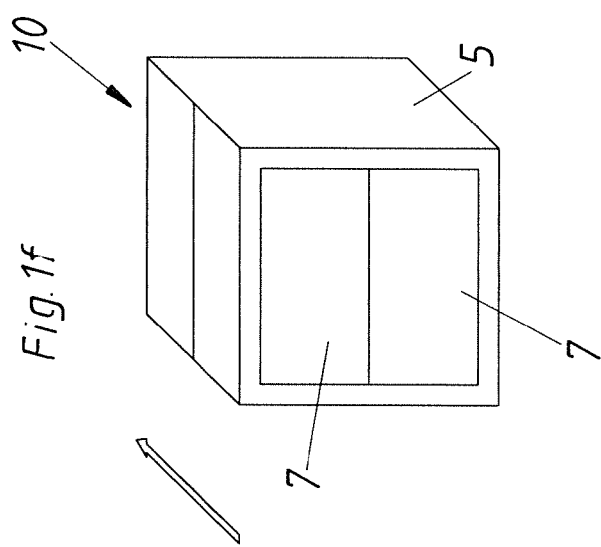

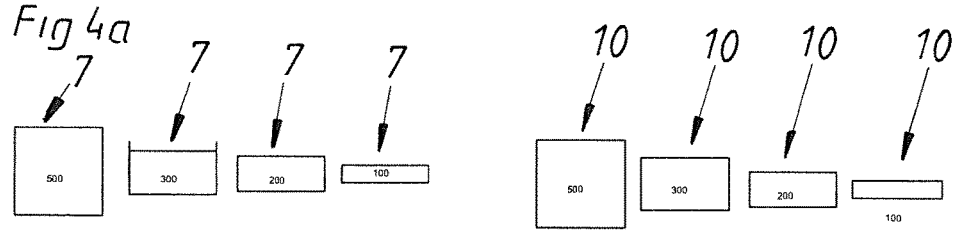
Fig 4a
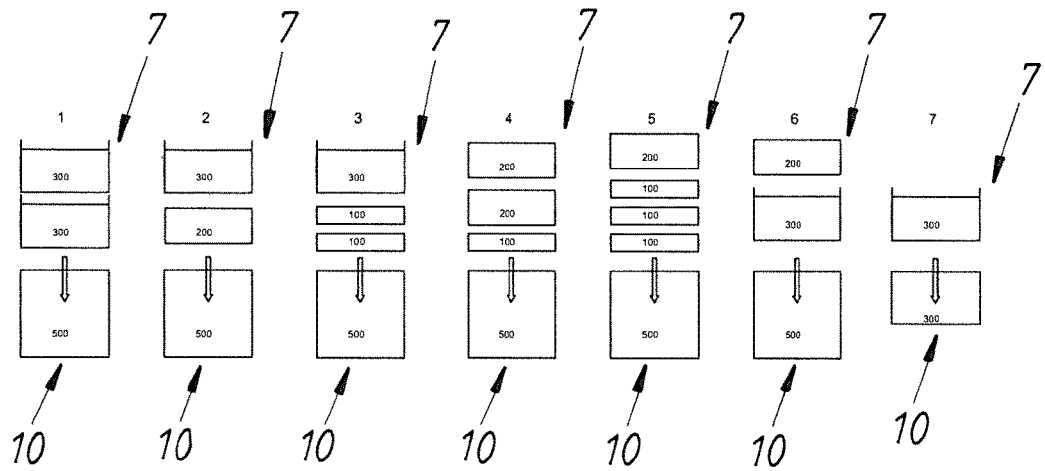
Fig. 4b
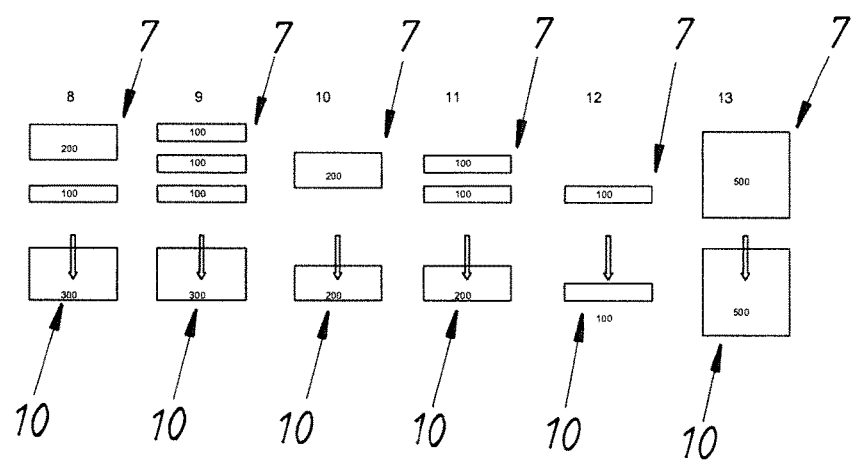

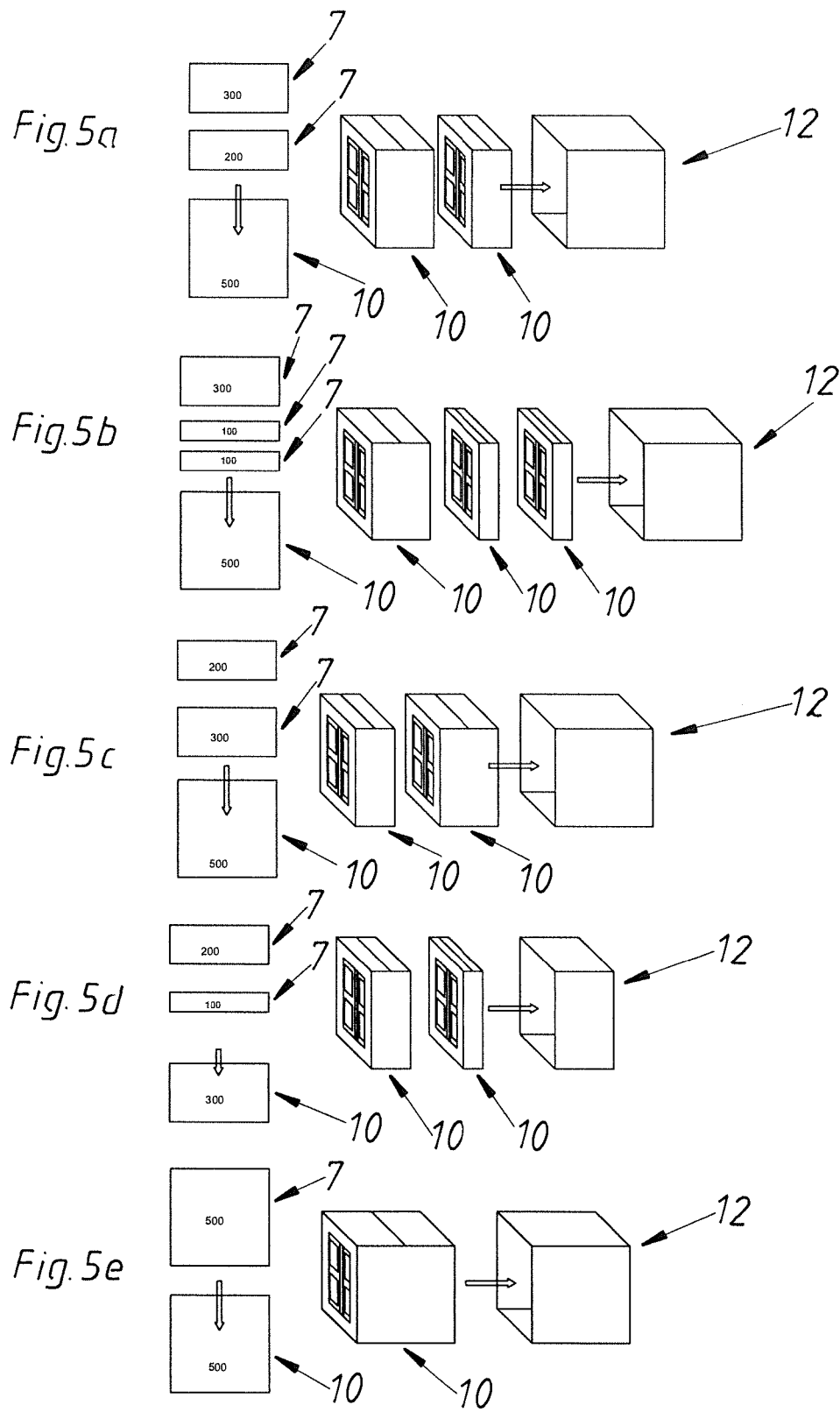

CLEANING SYSTEM FOR PAINT PARTICLES

BACKGROUND OF THE INVENTION

The present invention concerns a separation structure for cleaning an air flow, a cleaning module for cleaning an air flow, a set and an insertion frame.

The modular arrangement of filter modules of cardboard is known from WO 03/084638 A2. The modules serve for the separation of paint particles or paint mist (overspray) from an exhaust air from a spray booth in which, for example, parts for a motor vehicle are being painted.

It is noteworthy in that respect that a very large number of various paints is used. As a result, the exhaust air from spray booths contains widely varying kinds of paint impurities which, for example, are distinguished by particle size and moisture content. For relatively small dry particles, labyrinths with small openings and severe deflection configurations have to be provided for separation purposes so that due to their inertia (or due to centrifugal force) the particles are stopped at deflecting baffle walls of the labyrinth or the separator while the cleaned air issues downstream of the filter module.

When dealing with large particle sizes with a high proportion of moisture, a large amount of paint can be separated off in a cleaning module over a short time. Particularly when the cleaning modules are disposed in the floor of the spray booth, that results in a heavy loading on the cleaning module which is made from cardboard. That loading is still further increased by the suction action of a fan for producing the air flow through the cleaning modules. In the case of cleaning modules in accordance with the state of the art, the result of this is that the separation structures present therein collapse under their own weight when loaded with paint and no longer perform their function.

SUMMARY OF THE INVENTION

An object of the invention is to provide a separation structure, a cleaning module, an insertion frame, and a set comprising a hollow body and cleaning sub-structures, which allow an enlarged range of applications. In other words, the hollow body and sub-structures are suitable for the separation of paint particles and overspray with a greater degree of variety than is the case in the state of the art.

In accordance with the invention, that object is achieved on the one hand by an increased stability being imparted to the separation structure by the provision of at least one stabilization wall. On the other hand, that object is effected by the cleaning structure having at least two mutually separate cleaning sub-structures which by way of an opening element on the hollow body can be removed from the hollow body and/or can be arranged in the hollow body. By virtue of the provision of a set in which at least two different combinations of cleaning sub-structures can be arranged in the hollow body, it is possible to achieve an even broader applicability.

In particular, cleaning sub-structures and/or the cleaning modules can be replaceable independently of each other.

In order to be able to remove even very fine overspray from the air flow, the at least two cleaning sub-structures can include a filter structure. Such filter structures can be of various different configurations. For example, it is possible here to use a mat or a fleece of glass fibers. Preferred thicknesses of such mats or fleeces are preferably below 20 cm and particularly preferably below 10 cm. In addition, it is possible to use so-called Columbus material as the filter material. That comprises paper, preferably waste paper, in which parallel and displaced slits are stamped or cut. Openings are produced by pulling transversely relative to the slits. A plurality of layers of that material can advantageously be used as the filter material.

Separation structures can also be designed in various ways. For example, they can be rectangular structures in a plan view, after being unfolded. Diamond structures however are also known (for example marketed under the name "Andreae").

Cleaning modules according to the invention can be arranged in insertion frames. Those insertion frames can extend over a wall, the top, or the floor of the spray booth. The cleaning modules can be arranged in succession in those insertion frames and individually removed or replaced.

Separation structures can preferably be provided in various geometrical dimensions, in particular thicknesses.

It is also possible to provide separation structures which, in particular by virtue of the size of the openings, are optimized to the separation of particles of differing sizes. In particular, the separation structures can be of such configurations that those with greater geometrical dimensions, in particular thicknesses, are optimized for the separation of larger particles, and vice-versa.

That permits accurate matching of the cleaning module to the soiling involved in the air flow (particle size, degree of moisture). That also permits selective swapping of successively arranged cleaning modules, which is advantageous as separation structures which are optimized for various particle sizes reach their capacity limit at different rates.

It is further advantageous that the selective swappability of the cleaning modules means that stockkeeping is necessary to a lesser degree.

For a good fit of the cleaning sub-structures in the hollow body, in a view along an axis which is substantially parallel to air flow in the condition of being arranged in the hollow body, the cleaning sub-structures can have a contour which substantially corresponds to a cross-section, preferably perpendicular to the air flow, of a hollow space in the hollow body. That also ensures that no flow portion of the air flow remains uncleaned because no path leads past the cleaning sub-structures.

Particularly preferably, at least one separation structure can be folded together. Storage and transport of the separation structures is considerably facilitated by the reduced volume.

That effect is further enhanced if it is provided that the at least one separation structure is substantially flat after being folded together.

The reinforcing action of a stabilization wall can be improved in that the separation structure is inhibited in terms of being folded together in the condition of being arranged in the hollow body, by internal walls in the hollow body.

Preferably, the at least one stabilization wall can be arranged substantially centrally with respect to a direction in the plane of the baffle walls. That can optimize the strengthening action of the stabilization wall.

The at least one stabilization wall can be connected to the at least two baffle walls, and that is preferably the case in a foldable and/or hinged fashion. That can be easily implemented, for example, by a film hinge. That permits a very flat structure in the condition of being folded together, which in the unfolded condition enjoys a high degree of stiffness.

In addition, preferably the at least one stabilization wall is oriented substantially parallel to the air flow. For, particularly when the cleaning module is arranged in a floor or a ceiling of a spray booth, the direction of the air flow corresponds to that direction of the main loading on the separation structure.

Quite particularly, preferably the hollow body and/or at least one separation structure comprises cardboard, paper, or card. That permits particularly simple disposal or recycling of the separation structures or the cleaning modules. It is, however, certainly also conceivable for separation structures and/or hollow bodies to be made from metal, plastic, wood or the like.

In a further preferred configuration, at least one separation structure can have at least two flaps which are oriented substantially parallel to the air flow and between which a further separation structure can be arranged in a hollow body. As a result, it is possible for a separation structure to serve for various geometrical dimensions involved, in particular thicknesses. That means it can be used either with a separation structure between the flaps, or without. In the latter case, the flaps serve as spacers relative to an internal wall of the hollow body or a further separation structure.

BRIEF DESCRIPTION OF THE DRAWINGS

Further advantages and details of the invention will be apparent from the Figures and the related specific description. In the Figures:

FIGS. 1a through 1h show various perspective diagrammatic views of cleaning modules according to the invention, FIGS. 4a and 4b show diagrammatic views of various combination options of separation structures according to the invention in cleaning modules, and FIGS. 5a through 5e show views of possible arrangements of cleaning modules according to the invention in insertion frames.

DETAILED DESCRIPTION OF THE INVENTION

Figure 1A:
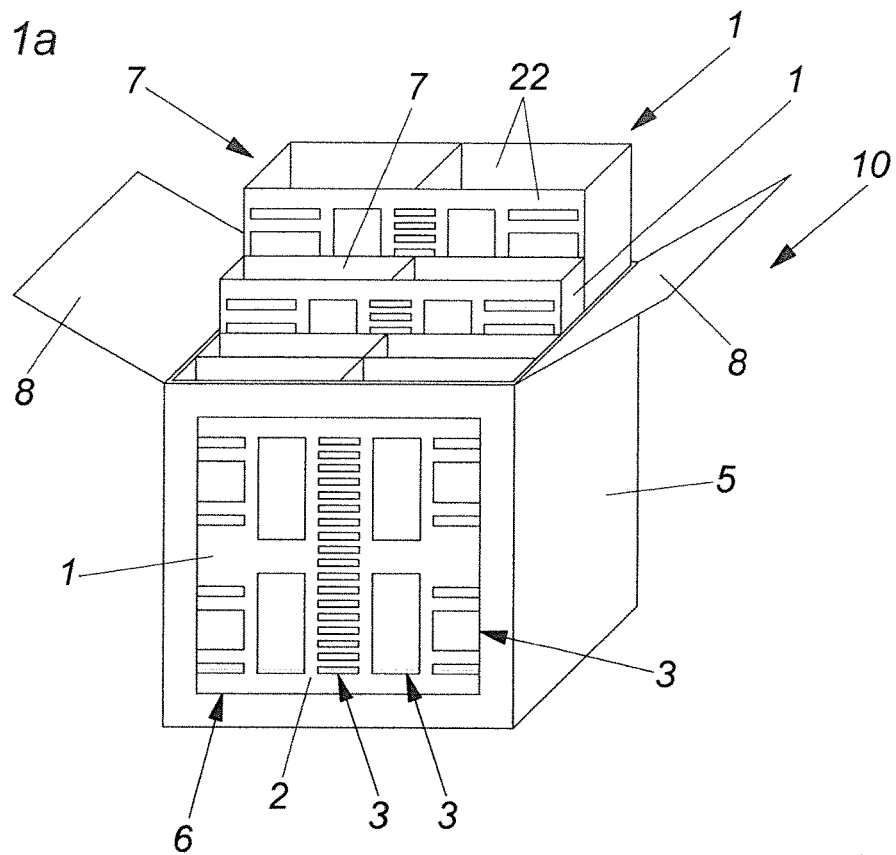

The cleaning module 10 shown in FIG. 1a firstly includes a hollow body 5 as well an intake opening 6 for the intake of the air flow to be cleaned. As the outlet opening is arranged on the rear of the hollow body 5 it cannot be seen in these views. The outlet opening has a substantially similar configuration to the intake opening 6.

The hollow body 5 has opening elements 8 which are in the form of opening flaps. In the present view, they are opened so that there is a clear view on to the interior of the hollow body 5. FIG. 1a shows a plurality of cleaning sub-structures 7 which in this case are all in the form of separation structures 1. The separation structures 1 have baffle walls 2 provided with openings 3. For the sake of clarity, not all baffle walls 2 and all openings 3 are provided with reference numerals as they are in part present as a multiplicity thereof.

Figure 1B:
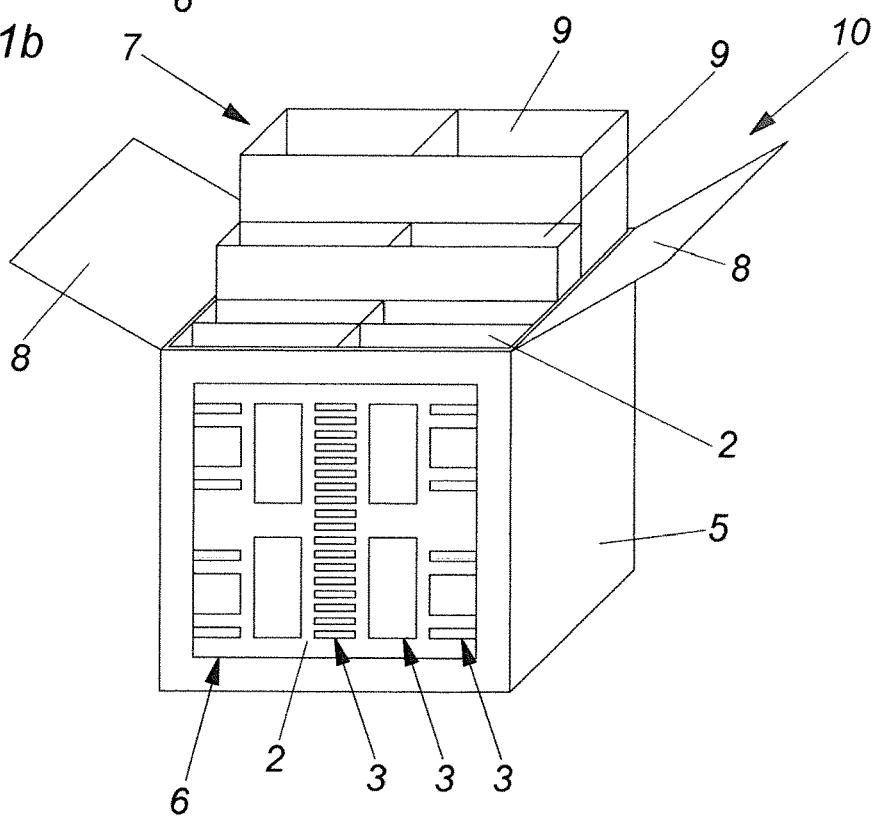

FIG. 1b is similar to FIG. 1a except for the difference that two of the cleaning structures 7 are in the form of filter structures 9. Those filter structures 9 include glass fiber mats or fleeces but can also include Columbus material or the like.

FIG. 1c again shows the cleaning module 10 but this time with closed opening elements 8. The cleaning module can be inserted in that condition.

Figure 1D:
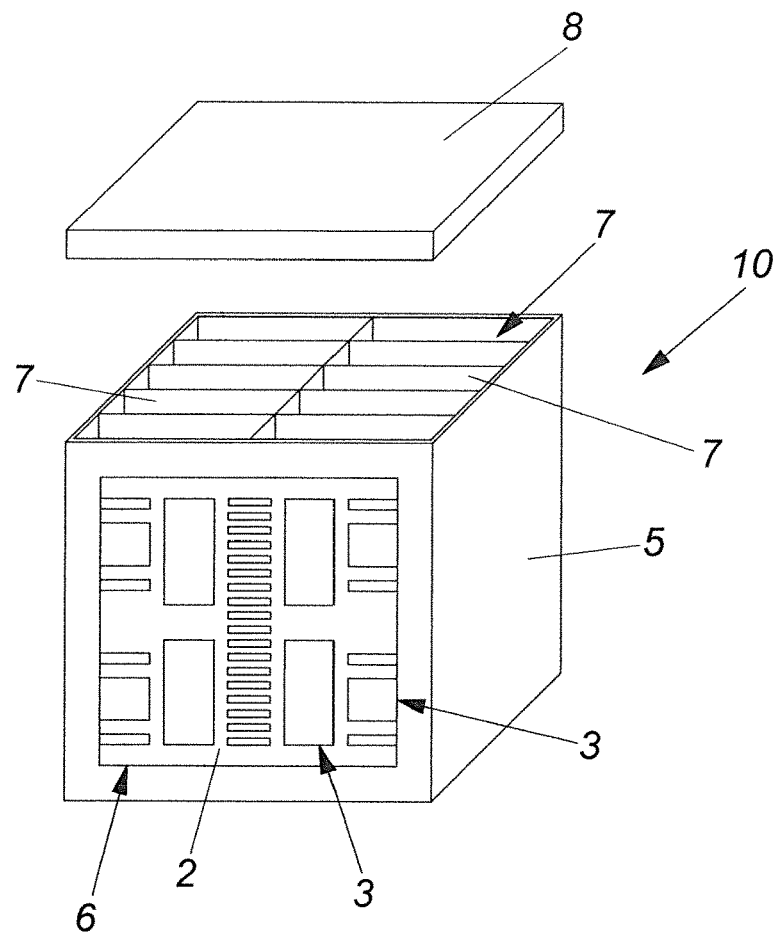
Figure 1E:
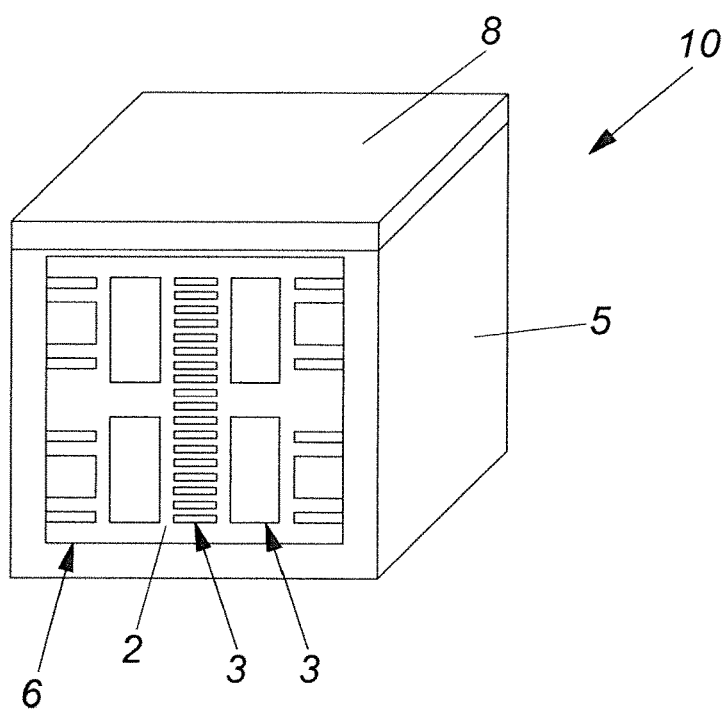

The opening elements 8 can also be in the form of removable covers (shoebox-like), which is shown in FIGS. 1d and 1e. Otherwise, the cleaning module 10 in FIGS. 1d and 1e is similar to those in FIGS. 1a through 1c.

FIGS. 1f through 1h show further embodiments, wherein the cleaning sub-structures 7 in these cases do not extend over the entire cross-sectional area (from the point of view of the air flow which is indicated by an arrow beside 1f) of the hollow body 5.

Figure 2A:
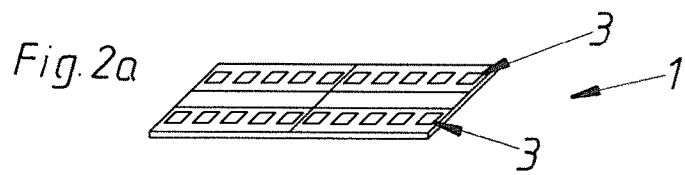
FIGS. 2a through 2h show perspective views of a separation structure according to the invention in various folded conditions.
Figure 2B:
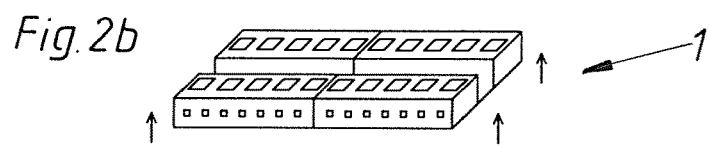
Figure 2C:
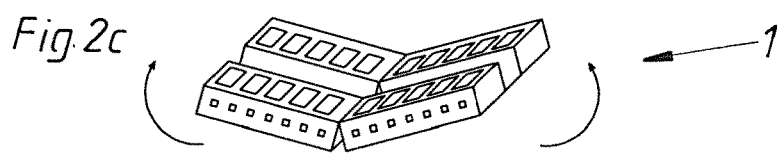
Figure 2D:
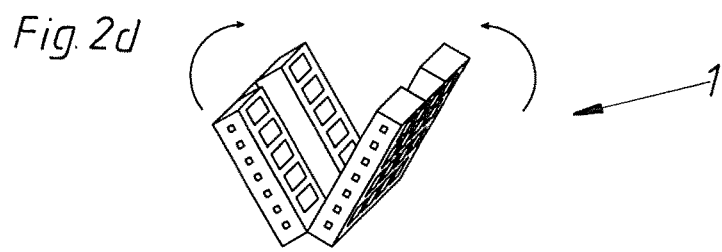

FIGS. 2a through 2h show a first embodiment of a separation structure 1 according to the invention in various folded conditions. FIG. 2a in that respect firstly shows the separation structure 1 in the delivery state. Parts of the structure are then unfolded (FIG. 2b). The entire separation structure 1 is thereafter folded together once again, in which case the parts unfolded in FIG. 2b face towards each other.

Figure 2E:
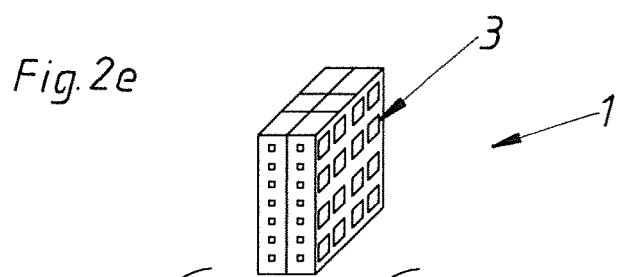
Figures 2F, 2G, 2H:
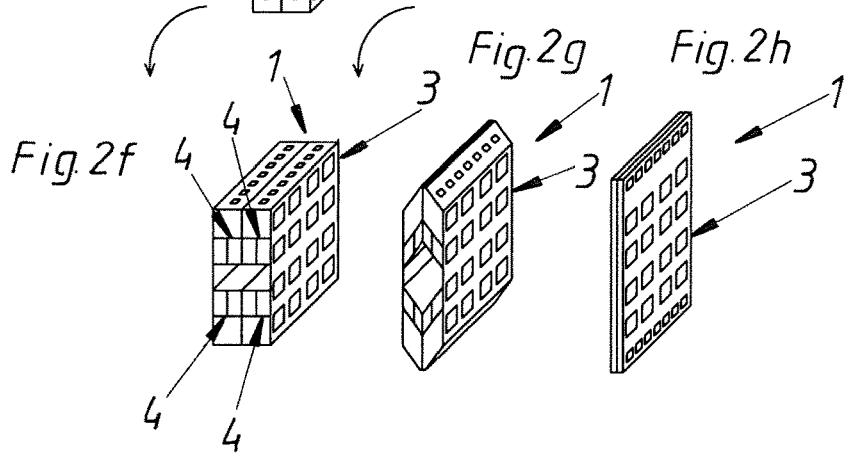

Then the condition of the separation structure 1 is such that it can be fitted in a cleaning module 10 (FIG. 2e). FIG. 2f corresponds to FIG. 2e, with the separation structure 1 being shown in a turned position, as indicated by arrows. After use in a cleaning module 10, for example upon disposal of the cleaning module 10, the separation structure 1 can be made substantially flat (FIG. 2h) by a single folding operation (FIG. 2g). That can simplify disposal thereof.

Figure 3A:
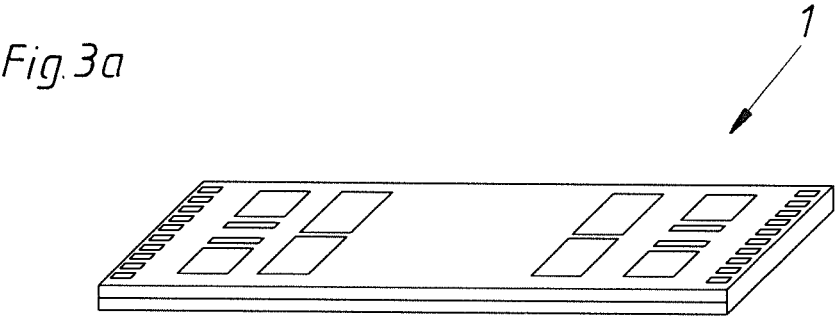
FIGS. 3a through 3c show a further embodiment of a separation structure according to the invention in various folded conditions.
Figure 3B:
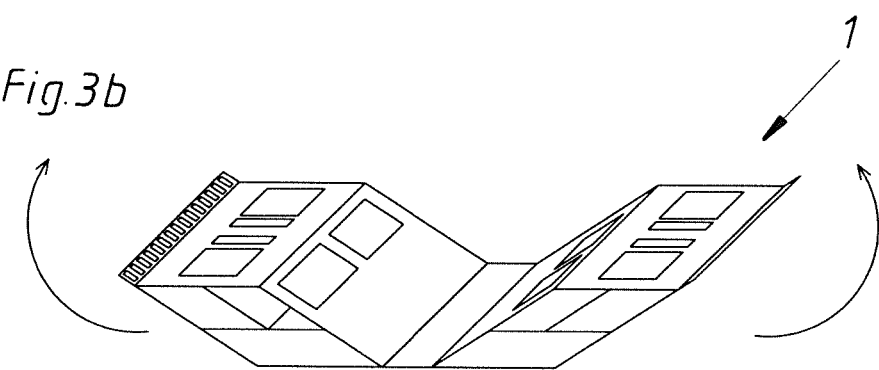
Figure 3C:
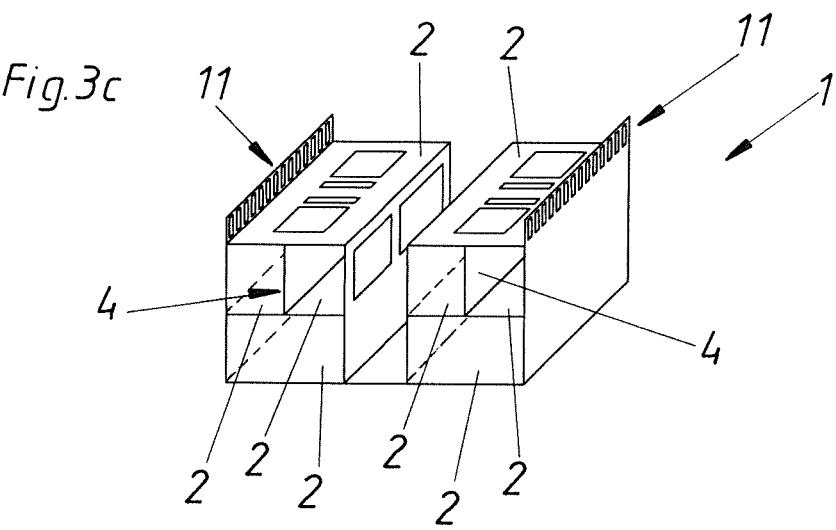

FIGS. 3a through 3c show a further separation structure 1 according to the invention. This separation structure 1 can be put into the operating condition (FIG. 3c) from the delivery state (FIG. 3a) by a folding operation (FIG. 3b) which is indicated by arrows. The arrangement of the stabilization walls 4 between the baffle walls 2 can be particularly clearly seen in this embodiment. The stabilization walls 4 are arranged substantially centrally with respect to a direction in the plane of the baffle walls 2. It is also possible to see flaps 11, between which on the one hand further separation structures 1 can be arranged—to save space—and which on the other hand can function as spacers so that the separation structure 1 is firmly fitted in the cleaning module 10.

FIGS. 4a and 4b diagrammatically show cleaning sub-structures 7 of various geometrical dimensions, in particular thickness, as well as various combinations of their arrangement in a cleaning module 10 (which includes the hollow body 5, as noted above). In this embodiment, the cleaning sub-structures 7 are provided in three different thicknesses of 100 mm, 200 mm, 300 mm or 500 mm, and the thicknesses are respectively noted on the cleaning sub-structures 7. Similarly, there are cleaning modules 10 in various design configurations, which differ by virtue of the overall thickness of cleaning sub-structures 7 which they are capable of adopting. In this case, too, the various overall thicknesses of 100 mm, 200 mm, 300 mm or 500 mm are noted on the cleaning modules 10.

FIG. 4b shows some various changeable combination options which are consecutively numbered. In the designs 1 through 6, a respective cleaning module 10 (with hollow body 5) is used, which can accommodate cleaning sub-structures 7 involving an overall thickness of 500 mm. In the configurations 7 through 9, the cleaning module 10 accommodates cleaning sub-structures of an overall thickness of 300 mm. The configurations 10 and 11 concern cleaning modules 10 with a 200 mm overall thickness. Configuration 12 concerns a cleaning module with a 100 mm overall thickness. Configuration 13 concerns a cleaning module with a 500 mm overall thickness. The various possible combinations are apparent therefrom. Thus, a set can comprise a hollow body 5 which has an intake opening 6 for the intake of an air flow to be cleaned and an outlet opening for the outlet of the cleaned air flow, and a plurality of cleaning sub-structures 7. As shown in FIG. 4b, at least two different combinations of types of cleaning sub-structures 7 can be arranged in the hollow body 5 of module 10, such as combinations including types of cleaning sub-structures with an overall thickness of 500 mm, an overall thickness of 300 mm, an overall thickness of 200 mm, or an overall thickness of 100 mm.

It is to be noted that the cleaning sub-structure 7 which is 300 mm in thickness has flaps 11. For the sake of clarity, not all flaps 11 are provided with reference numerals. In that way, the cleaning sub-structure 7 which is in the form of a separation structure 1 can serve as a cleaning sub-structure 7 of a thickness of 300 mm (configurations 6 and 7 in FIG. 4b) or a thickness of 200 mm (configuration 1 in FIG. 4b).

Cleaning modules 10 according to the invention can be arranged in succession in insertion frames 12. Here, too, various combinations are possible, which is shown on the one hand diagrammatically (at the left) and on the other hand as a perspective view (at the right) in FIGS. 5a through 5e respectively. Preferably, cleaning modules 10 which are optimized for coarser paint impurities or paint droplets are arrange facing the contaminated air flow. They can then be changed individually. Those cleaning modules which reach their capacity limit later can remain in the insertion frames 12 for longer.

The invention claimed is:

1. A set comprising:
    a hollow body having an intake opening for intake of an air flow to be cleaned, and an outlet opening for outlet of the cleaned air flow; and
    a plurality of different types of cleaning sub-structures for cleaning an air flow through the hollow body, the cleaning sub-structures including at least one separation structure having:
        at least two baffle walls arranged in succession in a direction of the air flow and having openings, and
        a stabilization wall arranged between the at least two baffle walls, the stabilization wall being oriented transversely relative to the baffle walls,
    wherein at least two different combinations of the different types of cleaning sub-structures are arrangeable in the hollow body.

2. The set as set forth in claim 1, wherein the stabilization wall is oriented substantially parallel to the air flow.

3. The set as set forth in claim 1, wherein the at least one separation structure has openings (i) displaced transversely relative to a direction of the air flow and/or (ii) different in size along the direction of the air flow.

4. The set as set forth in claim 1, wherein the hollow body and/or the at least one separation structure comprises cardboard, paper, or card.

5. The set as set forth in claim 1, wherein the at least one separation structure has at least two flaps oriented substantially parallel to the air flow, a further separation structure being arranged in the hollow body between the at least two flaps.

6. The set as set forth in claim 1, wherein the stabilization wall is connected to the at least two baffle walls.

7. The set as set forth in claim 6, wherein the stabilization wall is connected to the at least two baffle walls foldably and/or hingedly.

8. The set as set forth in claim 1, wherein at least one of the at least one separation structure is foldable together.

9. The set as set forth in claim 8, wherein the at least one separation structure is substantially flat after being folded together.

10. The set as set forth in claim 8, wherein the at least one separation structure is inhibited from being folded together when arranged in the hollow body by internal walls in the hollow body.

11. The set as set forth in claim 1,
    wherein the cleaning sub-structures comprise at least two mutually separate cleaning sub-structures which by way of an opening element on the hollow body can be removed from the hollow body and/or can be arranged in the hollow body.

12. The set as set forth in claim 11, wherein the at least two mutually separate cleaning sub-structures include a filter structure.

13. The set as set forth in claim 11 wherein the at least one separation structure comprises a plurality of separation structures provided in various geometrical dimensions.

14. The set as set forth in claim 11, wherein the at least one separation structure comprises a plurality of separation structures optimized for the separation of particles of differing sizes due to a size of openings in the separation structures.

15. The set as set forth in claim 11, wherein the hollow body is substantially cuboidal.

16. The set as set forth in claim 11, wherein in a view along an axis substantially parallel to the air flow and when the cleaning sub-structures are arranged in the hollow body, the cleaning sub-structures have a contour corresponding to a cross-section of a hollow space in the hollow body.

17. The set as set forth in claim 11, wherein the hollow body is one of at least two hollow bodies, the set further comprising an insertion frame in which the at least two hollow bodies are arranged in succession in the direction of the air flow.

18. The set as set forth in claim 11, wherein the at least one separation structure can be folded together.

* * * * *